TUNABLE ELECTRIC CIRCUIT ELEMENTS

Filed Aug. 6, 1953 2 Sheets-Sheet 1

INVENTOR.
ISAAC S. BLONDER

BY Rines and Rines

ATTORNEYS

Jan. 22, 1957 I. S. BLONDER 2,778,943

TUNABLE ELECTRIC CIRCUIT ELEMENTS

Filed Aug. 6, 1953 2 Sheets-Sheet 2

INVENTOR.
ISAAC S. BLONDER
BY Rines and Rines
ATTORNEYS 2,778,943
Patented Jan. 22, 1957

2,778,943

TUNABLE ELECTRIC CIRCUIT ELEMENTS

Isaac S. Blonder, Westfield, N. J.

Application August 6, 1953, Serial No. 372,650
11 Claims. (Cl. 250—40)

The present invention relates to tunable electric circuits and electric-circuit elements and more particularly to tunable ultra-high-frequency circuits.

At ultra-high frequencies, say in the neighborhood of 500 to 1000 megacycles, more or less, it is difficult to provide circuit elements that are adapted to be tuned over wide frequency ranges. Some of these difficulties arise because the physical dimensions of the circuit elements themselves are appreciable portions of the quarter wavelength of the ultra-high frequencies to be utilized. This results in numerous spurious resonant responses. In addition, it is difficult to provide for easy tuning of conventional coils and/or condensers as for the purpose of tuning such conventional elements through very wide ranges of very high frequency bands. As an illustration, it is necessary in ultra-high-frequency television converter systems, which are adapted to receive the ultra-high-frequency television-signal transmissions and to convert them (by means of beating or mixing the received signal with local oscillations) to a lower or intermediate frequency signal which can be handled by present-day VHF television receivers, to provide ultra-high-frequency receiving circuits tunable from about 470 megacycles to about 890 megacycles. It has previously been proposed to employ resonant-cavity chambers and complicated tuned-circuit networks to achieve such ultra-high-frequency wide-band tuning. It has also been proposed to use a pair of tunable transmission lines. Included in these last-named proposals are transmission lines coiled in the form of a circle and provided with shorting contacts that ride along the circle to short the line at successively disposed points, thereby to provide successive changes in impedance and tuning. Whether cavity resonators, complicated electrical elements or circular or other transmission lines are utilized, however, the circuits involved are inherently complex and they require a high degree of manufacturing tolerance in order to enable them to operate successfully. It has heretofore been necessary, therefore, to employ a great deal of skilled hand labor to adjust each individual device in order to get it to respond properly over the required wide radio-frequency bands. This has added greatly to the cost and the manufacturing complexity of such devices, and has rendered their successful and reliable mass-production at low cost largely unfeasible. The equipment used for the manufacture of such devices as well as the blanks from which the tuned-circuit elements are formed, moreover, are only suited to particular frequency ranges and are not adapted for universal use for any desired ultra-high-frequency bands.

An object of the present invention is to provide a new and improved ultra-high-frequency tuning circuit that is not subject to these disadvantages, and that, on the contrary, is simple to construct and requires no special manufacturing tolerances that cannot be obtained by ordinary mass-manufacturing techniques without the necessity for special skilled hand labor and individual circuit adjustments.

A further object is to provide new and improved electric circuit elements and blanks therefor particularly adapted for tuning over any desired wide ultra-high-frequency ranges and that, in addition, can be easily modified to produce any desired law of variation of impedance or tuning.

Still an additional object is to provide a new and improved system of the character described which permits the tracking of the tuning of, for example, a local oscillator with the tuning of an ultra-high-frequency radio-receiving tuned circuit such that synchronously with the tuning of the radio-receiving circuit, the local oscillator is also tuned in a manner and in accordance with a predetermined law always to produce a predetermined intermediate frequency.

Other and further objects will be explained hereinafter and will be more particularly pointed out in the appended claims.

The invention will now be described in connection with the accompanying drawing, Fig. 1 of which is a schematic perspective illustrating the invention, parts being broken away in order that the details of construction may be patent;

Though the invention, for illustrative purposes, will hereinafter be described in connection with ultra-high-frequency television circuits, it is to be understood that the invention is of broader utility in many other applications where the advantages of the invention are desired. While a converter circuit embodying an ultra-high-frequency radio-frequency tuned circuit and a local oscillator tuned circuit is discussed, moreover, it is to be understood that other kinds of radio-frequency circuits may similarly be employed.

Figures 1, 2, 3, 4, 5:
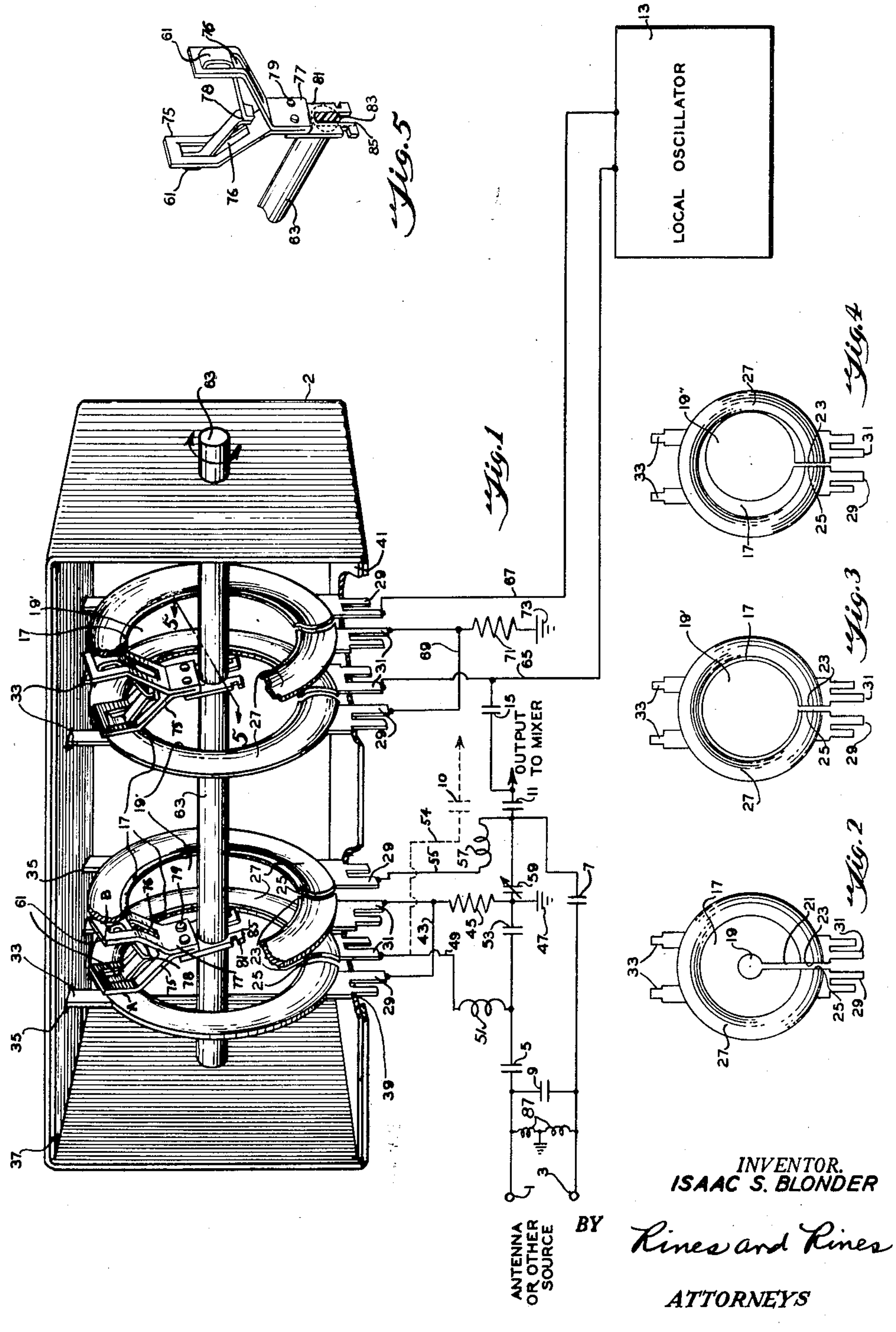
Fig. 2 is an elevation of a blank from which the circuit elements of Fig. 1 may be formed.
Figs. 3 and 4 are views of modified circuit elements.
Fig. 5 is a section taken along the line 5—5 of Fig. 1, looking in the direction of the arrows.

Referring to Fig. 1, an antenna system or other source of ultra-high-frequency energy may be connected to the terminals 1–3 of a capacitor voltage-divider network comprising a condenser 5, a further condenser 7 and a terminal capacitance 9 connected between the terminals 1 and 3. This capacitor voltage-divider, as later explained, will feed the ultra-high-frequency television-signal transmissions from the antenna or other source to a radio-frequency circuit that is to be tunable from 470 to 890 megacycles. Intermediately grounded coils 87 shunt the capacitance 9 to provide a low shunt impedance for frequencies below 470 megacycles. The signal may then be fed through a coupling condenser 11 to an output circuit which may comprise a crystal or other mixer, labelled "output to mixer." A local oscillator 13 of any conventional type, such as of the Hartley or Colpitts types, may simultaneously produce high-frequency oscillations that are fed through a coupling condenser 15 to the same output circuit, in order to produce the desired mixed resultant lower predetermined intermediate frequency in the said mixer.

Since the tuned circuit elements of both the ultra-high-frequency television-signal receiving circuit and the local oscillator circuit of the present invention are of similar nature, it will conduce to clarity to begin to describe the novel basic circuit elements involved. In Fig. 2, a circuit-element blank is illustrated, which may easily be formed by die-stamping, punching or any other mass-production technique, and which, as will later be shown, is extremely flexible for enabling the production of a broad variety of tuned circuits the tuning of which may follow any of a wide variety of predetermined laws. This circuit element comprises a substantially flat, planar sheet-metal conducting plate 17, preferably of annular construction. While a substantially circular annular plate 17 is illustrated, deviations therefrom can, of course, be provided without departing from the scope of the present invention. The plate may, for example, be elliptic or oval or even be somewhat square or rectangular, but in all cases, it is preferably provided with an intermediate aperture or hole 19. This hole may be enlarged as shown at 19′ in Figs. 1 and 3 for purposes later explained.

The annular conducting plate 17 is provided with a radial split 21 at a region thereof, shown as the lower region only, to provide a pair of electric terminals 23 and 25. The plate 17 is deformed by ribbing along its outer periphery to provide a ridged transmission loop 27 raised out of the plane of the plate 17. The plate 17 is provided at the terminals 23 and 25 with a pair of planar lug extensions 29 and 31. At oppositely disposed points along the periphery of the plate 17, shown at the top, similar planar lug extensions 33 are provided. The lug extensions 33 at the top of the plate 17 are mounted within apertures or slots 35 in a planar insulating supporting sheet 37, shown horizontally supported in a chassis 2. The lug extensions 29 and 31 at the terminals 25 and 23 similarly are received in apertures or slots 39 in a further insulating support 41 disposed preferably substantially parallel to the support 37 in the chassis 2. The slots 35 and 39 are preferably disposed in opposition and along substantially parallel lines so that the plate 17 is mounted vertically, at right angles to the plane of the substantially parallel supports 37 and 41.

The tunable receiving circuit for the ultra-high-frequency energy received by the antenna comprises a pair of annular plates 17 of the character before-described mounted substantially parallelly in juxtaposition with the raised ribbed transmission loops 27 facing one another, as shown to the left in Fig. 1. One of the lug extensions 29 is shown connected by a conductor 43 to the lug extension 31 of the other annular plate 17 of the left-hand pair of plates. The conductor 43 is, in turn, connected through a parasitic-oscillator stopper resistance 45 to a ground terminal 47. In the specification and claims, the term "ground" is intended to connote not only actual earthing of the circuit, but, also, chassis or other reference potential.

The before-mentioned condenser 5 of the capacitor voltage-divider 5, 7, 9, is connected through a coil 51 by a conductor 49 to the lug extension 31 at the terminal 23 of the left-most plate 17. The coil 51 is decoupled through a fixed trimmer condenser 53 to the ground terminal 47. The voltage-divider capacitor 7 is similarly connected through a coil 57 by a conductor 55 to the lug extension 29 of the terminal 25 of the other plate 17 of the left-hand pair of plates. The conductor 55 is decoupled by a tunable trimmer condenser 59 to the ground terminal 47. The coils 51 and 57 serve as padding inductances to limit the tuning range of the tuned circuit to the desired values.

A Y-shaped contactor 75 is shown disposed between the left-hand pair of plates 17. The contactor 75 is provided with a pair of electrically connected resilient contacting-arm surfaces 61 that bear respectively upon oppositely disposed points A and B of the raised transmission loops 27 of each of the left-hand pair of plates 17. The contacting surfaces 61 extend as tongues through longitudinal slots 76 in the arms of the Y and their free ends extend through the respective slots 76 and engage each other at downwardly bent engaging members 78 within the included angle of the Y. The width of the contactor 75 between the outwardly extending contacting-arm surfaces 61 is made slightly larger than the separation between the transmission loops 27 of the pair of adjacent annular plates 17 in order that the surfaces 61 may be depressed and bear resiliently against the oppositely disposed loops 27, providing long-lasting resiliency and sure contact for prolonged periods of operation. The transmission loops 27 thus present a certain impedance between the conductors 49 and 55 in the circuit traceable from the conductor 49 through the lug 31 of the left-most plate 17, along the right-hand portion of the raised loop 27 of the left-most plate 17 to the point A, through the engaged contacting-arm surfaces 61 of the contactor 75 to the point B of the right-hand plate 17, and down along the raised transmission loop 27 to the terminal 29 of the right-hand plate 17 of the said pair of plates. This circuit provides a certain amount of inductance and capacitance, depending upon the position of the points A and B. There is also connected across this circuit, the inductance and capacitance represented by the remaining portions of the raised transmission loops 27 connected by the common conductor 43 through the resistor 45 to the ground terminal 47.

The contactor 75, as more clearly shown in Fig. 5, is mounted by rivets 79 at its base 77 upon a mounting plate 81 that, in turn, is fitted by a slot 85 clinched over a reduced notch 83 of a rotatable insulating shaft 63 preferably passed through the chassis 2 along the axis of the annular plate conductors 17. Rotation of the shaft 63 causes the radially extending contactor 75 to move along the circular transmission loops 27, thus to vary the effective inductance and capacitance appearing between the terminals 31 and 29 of the left and right annular plate conductors 17 of the left-hand pair of plates 17. Such variation in inductance and capacitance, of course, tunes the circuit to receive and resonate at successively different frequencies. By rotating the shaft 63, therefore, a variable tuning through the desired range is effective. For the 470 to 890 megacycle range, for example, the plate conductors 17 should preferably have an outer diameter of about one and one-quarter inches and a raised transmission loop 27 about three-sixteenths of an inch in width. The lug extensions may all be of the order of a quarter of an inch in length. As before stated, the hole 19 of the blank of Fig. 2 is shown expanded into a much larger hole 19′ in Figs. 1 and 3. This expansion is effected to produce the desired value of inductance, the width of the loop 27 and the size and shape and position of the hole 19 affecting the impedance value of the element. By locating the ridged loop 27 at the periphery of the plates 17, indeed, the largest possible inductance variation is effected consistent with the largest possible contact surface and minimum contact wear. This larger hole 19′ may be stamped from the blank of Fig. 2, and for the above-mentioned frequencies should be preferably about an inch and one-sixteenth in diameter. The left-hand pair of plate conductors 17 should preferably be separated about three-sixteenths of an inch for the application above-stated.

The tuned circuit of the local oscillator 13 also embodies a similar pair of annular plate conductors 17, shown as the right-hand pair in Fig. 1. The lug extension 31 of the left-hand annular plate 17 of the right-hand pair of plates is shown connected by a conductor 65 to the local oscillator 13, say, for example, to the control electrode of a triode oscillator tube 13. The lug extension 29 of the right-hand annular plate 17 of the right-hand pair of plates is connected by a conductor 67 to another part of the local oscillator circuit, say, to the plate of the tube 13. Variable inductance is again provided by this system, the rotatable shaft 63 rotating the right-hand contactor 75 to vary the inductance of the right-hand plate circuit elements of the local oscillator. The terminal 29 of the left-hand plate 17 of the right-hand pair of plates and the lug extension 31 of the right-most plate conductor 17 of this local oscillator tuned circuit are connected together through a common conductor 69, corresponding to the conductor 43 of the ultra-high-frequency tuned circuit comprising the left-hand pair of plates 17, and through a parasitic stopper resistor 71 to a ground terminal 73. The oscillator output may be taken through the beforementioned capacitor 15 to mix with the ultra-high-frequency received signal, thereby to produce the desired predetermined intermediate radio frequency in the crystal or other mixer.

The local oscillator 13 is thus tuned synchronously with the tuning of the ultra-high-frequency receiving circuit. It is necessary, however, that the local-oscillator tuning track the ultra-high-frequency tuning so as always to be tuned to a frequency differing therefrom by the same intermediate frequency. This may require that the tuning follow a particular law of variation of tuning with angular position of the contactor 75. Any desired predetermined law may be produced in accordance with the present invention merely by varying the size, shape and position of the hole 19 within the annular plate 17. In Fig. 3, the hole 19′ is shown centrally disposed. This has been found to be useful for the local oscillator tuned circuit. In Fig. 4, however, the hole 19″ is shown offset from the center in order that successively greater increments of inductance may be produced with successive angular position. This type of variation has been found to be particularly useful for the ultra-high-frequency receiving circuit, above described, to obtain a more rapid inductance variation at the low end of the television band than at the high end. Similarly, any other desired law may be achieved by varying the size, shape, and/or position of the hole.

Figure 6:
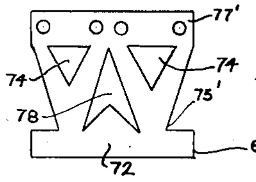
Figs. 6 to 10 are views of a preferred contactor, illustrating the same at successive steps of its manufacture.
Figure 7:
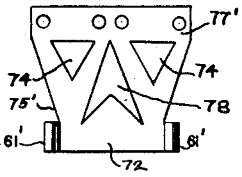
Figure 8:
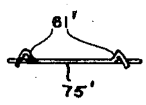
Figure 9:
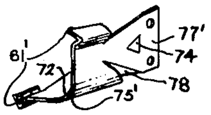
Figure 10:
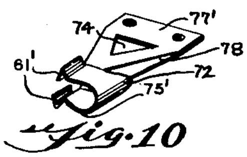
Figure 11:
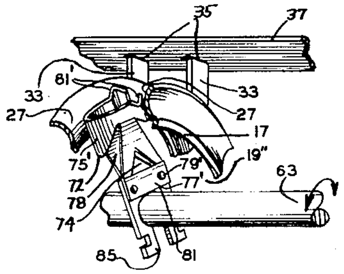
Fig. 11 is a fragmentary perspective of the contactor of Figs. 6 to 10 in the system of Fig. 1.

It will thus be evident that in accordance with the present invention, there is absolutely no need for special production techniques or careful aligning procedures. The plate blanks 17 are die-stamped or otherwise mass-produced, and standard punches provide the necessary predetermined hole 19′ or 19″. The plates 17 are mounted into the preformed slots 35, 39 in the insulating supports 37, 41 without the need for skilled labor or fine adjustments. Production errors and departure from strict tolerances are of negligible significance for the system is not critical. The system, in addition, is very inexpensive, since die-stamping operations can be used throughout. The same blanks, moreover, can be used for a host of different frequency bands and different laws of impedance variation and tuning.

Where a shorter electrical distance between the two contacting surfaces 61 is desired, the Y-shaped contactor 75 may assume the preferred form of Figs. 6 to 11. In Fig. 11, this modified Y-shaped contactor 75′ is illustrated with the diverging arms being transversely interconnected at the top by a curved band 72 that terminates in V-shaped contacting surfaces 61′ outwardly extending beyond the arms of the Y. The electrical path along the curved band 72 between the contacting surfaces 61′ can obviously be made as short as desired. The width of the band 72, moreover, is substantially inversely proportional to the distance between the contacting surfaces 61′ to attain substantially uniform stress. In this contactor 75′, moreover, the major portion of the spring tension is upon the band 72. The thinness of the base 77′, furthermore, permits the entire contactor 75′ to move laterally to compensate for mechanical defects in the circuit elements or their assembly. The successive steps in forming the contactor 75′ are illustrated in Figs. 6 to 10. The blank of Fig. 6 is provided with triangular-shaped apertures 74 adjacent the base 77′, and an intermediate aperture 78 that determines the width of the band 72. The free ends of the band 72 extend outwardly beyond the converging sides of the blank. In Fig. 7, these free ends are shown bent into V-shape to form the contacting-arm surfaces 61′. An end elevation is presented in Fig. 8. The band 72 is then formed, Figs. 9 and 10, by folding the blank in two. The contactor 75′ is then assembled upon the mounting member 81, as described in connection with the contactor 75 of Fig. 5.

While the output of the ultra-high-frequency-receiving and the local oscillator tuned circuits has been shown of the single-ended variety, fed through respective coupling condensers 11 and 15, push-pull outputs may be obtained, if desired. The dotted output conductor 54 and coupling condenser 10, Fig. 1, for example, illustrate how a push-pull output connection may be obtained between the terminal 31 of the left-most plate 17 and the output conductor 55.

Further modifications will occur to those skilled in the art and all such are considered to fall within the spirit and scope of the invention as defined in the appended claims.

What is claimed is:

1. A tunable circuit comprising a pair of similar substantially planar conducting annular plates each split at a single region to provide a pair of terminals, and ribbed along its outer periphery to provide a transmission loop raised out of the plane of the plate, the plates being juxtaposed with the raised loops facing each other, means for connecting together a terminal of each plate, means for feeding energy to the other terminals of the plates, a conductive contactor positioned between the plates and provided with a pair of electrically connected arms for bearing respectively upon oppositely disposed points of the raised loops of each of the pair of plates, and means for enabling movement of the contactor to different points along the loops to vary the impedance of the same between the said other terminals, thereby to tune the circuit.

2. A tunable circuit comprising a pair of similar substantially planar conducting annular plates each split at a single region to provide a pair of terminals and ribbed along its outer periphery to provide a transmission loop raised out of the plane of the plate, the plates each being provided at their respective terminals and at points along the outer periphery disposed opposite the terminals with lug extensions, a pair of insulator supports provided with apertures for receiving the lug extensions, one insulator support receiving the terminal lug extensions of each plate and the other insulator support receiving the lug extensions from the said opposite points of the plates in order to mount the plates in juxtaposition between the insulator supports with the raised loops facing each other, means for connecting together a terminal lug extension of each plate, means for feeding energy to the other terminal lug extensions of the plates, a conductive contactor positioned between the plates and provided with a pair of electrically connected arms for bearing respectively upon oppositely disposed points of the raised loops of each of the pair of plates, and means for enabling movement of the contactor to different points along the loops to vary the impedance of the same between the said other terminals, thereby to tune the circuit.

3. A tunable circuit comprising a pair of similar substantially planar conducting annular plates each split at a single region to provide a pair of terminals and ribbed along its outer periphery to provide a transmission loop raised out of the plane of the plate, the plates each being provided at their respective terminals and at points along the outer periphery disposed opposite the terminals with lug extensions, a pair of insulator supports provided with apertures for receiving the lug extensions, one insulator support receiving the terminal lug extensions of each plate and the other insulator support receiving the lug extensions from the said opposite points of the plates in order to mount the plates in juxtaposition between the insulator supports with the raised loops facing each other, means for connecting together a terminal lug extension of each plate, means for grounding the connected together terminal lug extensions, means for feeding radio-frequency energy to the other terminal lug extensions of the plates, an output circuit connected to one or both of the said other terminal lug extensions to provide single-ended or push-pull output connections thereto, a conductive contactor positioned between the plates and provided with a pair of electrically connected arms for bearing respectively upon oppositely disposed points of the raised loops of each of the pair of plates, and means for enabling movement of the contactor to different points along the loops to vary the impedance of the same between the said other terminals, thereby to tune the circuit.

4. A tunable circuit comprising a pair of similar substantially planar conducting annular plates each split at a single region to provide a pair of terminals and ribbed along its outer periphery to provide a transmission loop raised out of the plane of the plate, the plates each being provided at their respective terminals and at points along the outer periphery disposed opposite the terminals with lug extensions, a pair of insulator supports provided with apertures for receiving the lug extensions, one insulator support receiving the terminal lug extensions of each plate and the other insulator support receiving the lug extensions from the said opposite points of the plates in order to mount the plates in juxtaposition between the insulator supports with the raised loops facing each other, means for connecting together a terminal lug extension of each plate, means for grounding the connected together terminal lug extensions, a capacitive voltage divider for connecting the other terminal lug extensions of the plates to an antenna system, an output circuit connected to at least one of the said other terminal lug extensions, a trimmer condenser connected between each of the said other terminal lug extensions and ground, a conductive contactor positioned between the plates and provided with a pair of electrically connected arms for bearing respectively upon oppositely disposed points of the raised loops of each of the pair of plates, and means for enabling movement of the contactor to different points along the loops to vary the impedance of the same between the said other terminals, thereby to tune the circuit.

5. A tunable circuit comprising a pair of similar substantially planar conducting annular plates of substantially circular contour each radially split to provide a pair of terminals and ribbed along its outer circumference to provide a substantially circular transmission loop raised out of the plane of the plate, the plates each being provided at their respective terminals and at points along the outer circumference disposed opposite the terminals with lug extensions, a pair of substantially parallel planar insulator supports provided with apertures for receiving the lug extensions, one insulator support receiving the terminal lug extensions of each plate and the other insulator support receiving the lug extensions from the said opposite points of the plates in order to mount the plates in substantially parallel juxtaposition between the insulator supports with the raised loops facing each other, means for connecting together a terminal lug extension of each plate, means for grounding the connected together terminal lug extensions, a capacitive voltage divider for connecting the other terminal lug extensions of the plates to an antenna system, an output circuit connected to at least one of the said other terminal lug extensions, a trimmer condenser connected between each of the said other terminal lug extensions and ground, a rotatable dielectric shaft mounted substantially along the axis of the annular plates, and a conductive contactor mounted radially upon the shaft between the plates and provided with a pair of electrically connected arms for bearing respectively upon oppositely disposed points along the transmission loops of each of the pair of plates to vary the effective length of the transmission loops between the said other terminals, thereby to tune the circuit.

6. A tunable circuit comprising a pair of similar substantially planar conducting annular plates of substantially circular contour each radially split to provide a pair of terminals and ribbed along its outer circumference to provide a substantially circular transmission loop raised out of the plane of the plate, the plates each being provided at their respective terminals and at points along the outer circumference disposed opposite the terminals with lug extensions, a pair of substantially parallel planar insulator supports provided with apertures for receiving the lug extensions, one insulator support receiving the terminal lug extensions of each plate and the other insulator support receiving the lug extensions from the said opposite points of the plates in order to mount the plates in substantially parallel juxtaposition between the insulator supports with the raised loops facing each other, means for connecting together a terminal lug extension of each plate, means for grounding the connected together terminal lug extensions, a capacitive voltage divider for connecting the other terminal lug extensions of the plates to an antenna system, an output circuit connected to at least one of the said other terminal lug extensions, a trimmer condenser connected between each of the said other terminal lug extensions and ground, a rotatable dielectric shaft mounted substantially along the axis of the annular plates, and a sheet-metal Y-shaped conductive contactor mounted radially upon the shaft between the plates, each of the diverging arms of the Y being longitudinally slotted to provide a longitudinally extending resilient tongue the upper portion of which extends outwardly beyond the arm to form a contacting surface, the free ends of the tongues extending through the respective slots and engaging each other within the included angle of the arms of the Y, the width of the contactor between its outwardly extending contacting surfaces being slightly larger than the separation between the transmission loops of the pair of annular plates in order that the said contacting surfaces may resiliently bear against oppositely disposed points along the transmission loops of each of the pair of plates, whereby rotation of the shaft may vary the effective length of the transmission loops between the said other terminals to tune the circuit.

7. A movable sheet-metal Y-shaped conductive contactor for connecting oppositely disposed points along a pair of separated conducting surfaces, each of the diverging arms of the Y being longitudinally slotted to provide a longitudinally extending resilient tongue the upper portion of which extends outwardly beyond the arm to form a contacting surface, the free ends of the tongues extending through the respective slots and engaging each other within the included angle of the arms of the Y, the width of the contactor between its outwardly extending contacting surfaces being slightly larger than the separation between the said pair of conducting surfaces in order that the said contacting surfaces may resiliently bear against the said oppositely disposed points along the pair of conducting surfaces.

8. A plurality of tunable circuits having, in combination, a plurality of pairs of similar substantially planar conducting annular plates of substantially circular contour, each plate of each pair of plates being radially split to provide a pair of terminals and ribbed along its outer circumference to provide a substantially circular transmission loop raised out of the plane of the plate, the plates each being provided at their respective terminals and at points along the outer circumference disposed opposite the terminals with lug extensions, a pair of substantially parallel planar insulator supports provided with apertures for receiving the lug extensions, one insulator support receiving the terminal lug extensions of each plate and the other insulator support receiving the lug extensions from the said opposite points of the plates in order to mount the pairs of plates substantially parallelly between the insulator supports with the raised loops of the plates of each pair of plates facing each other, means for connecting together a terminal lug extension of each plate of each pair of plates, means for feeding energy to the other terminal lug extensions of the plates of each pair of plates, a rotatable dielectric shaft mounted substantially along the axis of the annular plates, and a plurality of conductive contactors, one corresponding to each pair of annular plates and mounted radially upon the shaft between the corresponding pair of plates and provided with a pair of electrically connected arms for bearing respectively upon oppositely disposed points along the transmission loops of each of the corresponding pair of plates in order simultaneously to vary the effective length of the transmission loops between the said other terminals of each pair of annular plates, thereby simultaneously synchronously to tune the plurality of tunable circuits.

9. A plurality of tunable circuits having, in combination, a plurality of pairs of similar substantially planar conducting annular plates of substantially circular contour, each plate of each pair of plates being radially split to provide a pair of terminals and ribbed along its outer circumference to provide a substantially circular transmission loop raised out of the plane of the plate, the plates each being provided at their respective terminals and at points along the outer circumference disposed opposite the terminals with lug extensions, a pair of substantially parallel planar insulator supports provided with apertures for receiving the lug extensions, one insulator support receiving the terminal lug extensions of each plate and the other insulator support receiving the lug extensions from the said opposite points of the plates in order to mount the pairs of plates substantially parallelly between the insulator supports with the raised loops of the plates of each pair of plates facing each other, means for connecting together a terminal lug extension of each plate of each pair of plates, means for feeding a plurality of different radio frequencies to the other terminal lug extensions of the plates of each of the plurality of pairs of plates, a rotatable dielectric shaft mounted substantially along the axis of the annular plates, a plurality of conductive contactors, one corresponding to each pair of annular plates and mounted radially upon the shaft between the corresponding pair of plates and provided with a pair of electrically connected arms for bearing respectively upon oppositely disposed points along the transmission loops of each of the corresponding pair of plates in order simultaneously to vary the effective length of the transmission loops between the said other terminals of each pair of annular plates, thereby simultaneously synchronously to tune the plurality of tunable circuits, each pair of annular plates having a hole of somewhat different position or size to permit tracking of the tuning of the plurality of tunable circuits.

10. A tunable circuit comprising a pair of similar substantially planar conducting annular plates of substantially circular contour each radially split to provide a pair of terminals and ribbed along its outer circumference to provide a substantially circular transmission loop raised out of the plane of the plate, the plates each being provided at their respective terminals and at points along the outer circumference disposed opposite the terminals with lug extensions, a pair of substantially parallel planar insulator supports provided with apertures for receiving the lug extensions, one insulator support receiving the terminal lug extensions of each plate and the other insulator support receiving the lug extensions from the said opposite points of the plates in order to mount the plates in substantially parallel juxtaposition between the insulator supports with the raised loops facing each other, means for connecting together a terminal lug extension of each plate, means for grounding the connected together terminal lug extensions, a capacitive voltage divider for connecting the other terminal lug extensions of the plates to an antenna system, an output circuit connected to at least one of the said other terminal lug extensions, a trimmer condenser connected between each of the said other terminal lug extensions and ground, a rotatable dielectric shaft mounted substantially along the axis of the annular plates, and a sheet-metal Y-shaped conductive contactor mounted radially upon the shaft between the plates, the diverging arms of the Y being transversely connected by a resilient curved band terminating in V-shaped contacting surfaces extending outwardly from the arms of the Y, the width of the contactor between its outwardly extending contacting surfaces being slightly larger than the separation between the transmission loops of the pair of annular plates in order that the said contacting surfaces may resiliently bear against oppositely disposed points along the transmission loops of each of the pair of plates, whereby rotation of the shaft may vary the effective length of the transmission loops between the said other terminals to tune the circuit.

11. A movable sheet-metal Y-shaped conductive contactor for connecting oppositely disposed points along a pair of separated conducting surfaces, the diverging arms of the Y being transversely connected by a resilient curved band terminating in contacting surfaces extending outwardly from the arms of the Y, the width of the contactor between its outwardly extending contacting surfaces being slightly larger than the separation between the said pair of conducting surfaces in order that the said contacting surfaces may resiliently bear against the said oppositely disposed points along the pair of conducting surfaces.

References Cited in the file of this patent

UNITED STATES PATENTS

| | | |
|---|---|---|
| 2,126,541 | De Forest | Aug. 9, 1938 |
| 2,292,254 | Van Beuren | Aug. 4, 1942 |
| 2,543,560 | Thias | Feb. 27, 1951 |
| 2,558,482 | Galitz | June 26, 1951 |
| 2,759,158 | Puerner et al. | Aug. 14, 1956 |

FOREIGN PATENTS

| | | |
|---|---|---|
| 906,770 | France | Jan. 18, 1946 |